(12) United States Patent
Jamieson

(10) Patent No.: US 7,693,705 B1
(45) Date of Patent: Apr. 6, 2010

(54) PROCESS FOR IMPROVING THE QUALITY OF DOCUMENTS USING SEMANTIC ANALYSIS

(76) Inventor: Patrick William Jamieson, 10172 Parkshore Dr., Noblesville, IN (US) 46060

( * ) Notice: Subject to any disclaimer, the term of this patent is extended or adjusted under 35 U.S.C. 154(b) by 643 days.

(21) Appl. No.: 11/058,878

(22) Filed: Feb. 16, 2005

(51) Int. Cl.
*G06F 17/27* (2006.01)
(52) U.S. Cl. .................. 704/9; 704/1; 704/10; 704/257; 704/270; 707/2; 707/3; 707/6
(58) Field of Classification Search .................... 704/9, 704/270.1, 257, 4, 231, 270, 1, 10; 707/2, 707/3, 6
See application file for complete search history.

(56) References Cited

U.S. PATENT DOCUMENTS

| | | | | |
|---|---|---|---|---|
| 5,224,206 | A * | 6/1993 | Simoudis ..................... 706/61 |
| 5,870,755 | A * | 2/1999 | Stevens et al. ........... 707/104.1 |
| 6,085,206 | A | 7/2000 | Domini et al. |
| 6,658,627 | B1 * | 12/2003 | Gallup et al. ............... 715/236 |
| 6,701,294 | B1 * | 3/2004 | Ball et al. ................... 704/257 |
| 7,343,134 | B1 * | 3/2008 | Ward .......................... 434/350 |
| 2002/0059220 | A1 * | 5/2002 | Little ............................. 707/5 |
| 2003/0055625 | A1 * | 3/2003 | Korelsky et al. ............... 704/9 |
| 2003/0144831 | A1 * | 7/2003 | Ford ............................... 704/9 |
| 2004/0117189 | A1 * | 6/2004 | Bennett ................... 704/270.1 |
| 2004/0174434 | A1 * | 9/2004 | Walker et al. ............ 348/211.3 |
| 2005/0043940 | A1 * | 2/2005 | Elder ............................ 704/9 |
| 2005/0137723 | A1 * | 6/2005 | Liu et al. ....................... 700/45 |
| 2005/0138538 | A1 * | 6/2005 | Raguseo ..................... 715/500 |
| 2005/0160107 | A1 * | 7/2005 | Liang ......................... 707/100 |
| 2005/0262503 | A1 * | 11/2005 | Kane .......................... 717/176 |
| 2006/0059031 | A1 * | 3/2006 | Hertel-Szabadi et al. ...... 705/10 |
| 2008/0221874 | A1 * | 9/2008 | Cao et al. ....................... 704/9 |

OTHER PUBLICATIONS

Johnson AJ, Radiology Report Quality: A Cohort Study of Point-and-Click Structured Reporting versus Conventional Dictation. Academic Radiology 2002; 9:1056-1061.
Silverman BG. Survey of Expert Critiquing Systems: Practical and Theoretical Frontiers. Communications of the Association of Computing Machinery, vol. 35(4): 106-127: 1992.
Langlotz CP. Enhancing the expressiveness of structured reporting systems. J Digit Imaging May 2000;13 (2 Supplement 1):49-53.

* cited by examiner

*Primary Examiner*—David R Hudspeth
*Assistant Examiner*—Lamont M Spooner

(57) ABSTRACT

The present invention provides a new method for returning context specific questions during the process of authoring a document or report. The questions alert an author of possible omissions and vague or general statements. The method employs techniques in semantic analysis including corpus linguistics and sentential logic. The method takes as input sentences created by the document author, and looks up semantic propositions connected to these sentences, which are in the document's knowledge domain, and questions linked to these propositions or other related propositions. The questions are sorted based on priority determined by a knowledge engineer. Additional methods are used to suppress redundant or nonspecific questions to increase their usefulness to the document author. The resulting question list aids the author in creating a high quality document.

16 Claims, 6 Drawing Sheets

PROCESS FOR IMPROVING THE QUALITY OF DOCUMENTS USING SEMANTIC ANALYSIS

CROSS REFERENCE TO RELATED APPLICATION

This application references application Ser. No. 10/844,912 titled, "Process for constructing a semantic knowledge base using a document corpus", filed on May 13, 2004, and incorporated herein by reference in its entirety.

FEDERALLY SPONSORED RESEARCH

Not applicable

SEQUENCE LISTING OR PROGRAM

None.

FIELD

The present invention relates to a method and system for generating pertinent questions for an author to consider during the process of creating a document or report by analyzing spoken or written language through natural language processing.

BACKGROUND

Often professionals author reports or documents to convey useful information so that other professionals can take action. Sometimes hundreds or thousands of reports may be generated by a single expert during the course of a year. For example, a radiologist interprets a medical image, and produces a short one page report which conveys diagnostic findings and conclusions to a referring physician. The quality of the report is crucial to patient diagnosis and treatment. Even infrequent lapses in report quality can affect the lives of many individuals since a typical radiologist dictates 18,000 reports per year. Unfortunately, radiology reports, like many other types of medical documents are non-standardized and frequently vague, incomplete and error prone [Johnson A J, Radiology Report Quality: A Cohort Study of Point-and-Click Structured Reporting versus Conventional Dictation. Academic Radiology 2002; 9:1056-1061.]

Although some guidelines are available to construct reports and documents of different types, rarely are those guidelines codified in a form that can be displayed in a context specific manner. Templates have been used to improve data collection by reducing missing, incorrect, and inconsistent data. Templates are outlines that structure text into blocks, paragraphs, or sentences. Frequently they contain well defined delimiters that are meant to be completed (instantiated) to produce a final document. Some physicians have used templates to improve report quality since a number of important observations may be embedded in a template.

However, in medicine as well as other complex domains, specialized knowledge must be conveyed, which is not stereotyped or easily encoded in a few master templates. There are simply too many different document types and context specific conditions, which vary from case to case to make template use practical. For example, a radiology report for a normal head computed tomography (CT) scan, is different from a normal sinus x-ray exam, which in turn is vastly different than a head CT with evidence of intraparenchymal hemorrhage.

Expert Critiquing Systems (ECSs) have been used in a variety of situations to provide a broad array of supportive functions. One appeal of such systems [Silverman B G. Survey of Expert Critiquing Systems: Practical and Theoretical Frontiers. Communications of the Association of Computing Machinery, Volume 35(4): 106-127: 1992] is to complement problem-solving systems through useful "critiques." In medical expert critiquing systems, a physician typically defines his/her treatment plan, after which the ECS performs a separate analysis. The ECS then calculates a "difference" between the proposed and computed solution, and highlights weaknesses in the proposed treatment plan. These rule-based expert systems are generally aimed at providing an analysis of a proposed treatment, rather than pertinent questions to further explore the problem space or refine document content. One drawback of "critiques" is professionals are more likely to modify a plan or a report by considering specific questions rather than simply being told what is wrong. Additionally, medical ECSs often give their critiques after all the input is known, and are thus of limited value in real-time document creation.

Nevertheless, ECSs have aided writers through grammar and spelling critiques. Domini, et al. (Method and system for verifying accuracy of spelling and grammatical composition of a document, U.S. Pat. No. 6,085,206) disclosed a system for verifying the accuracy of the grammatical composition of sentences within electronic documents. The real-time display of pertinent corrections provided a way to improve the grammatical aspects of document quality. However, similar systems have not been used to generate additional content suggestions or questions which may improve more fundament aspects of document quality.

Commercial structured documentation applications exist that can produce coded input to an expert system, and with additional engineering could be designed to generate questions that could improve report quality. [Langlotz C P. Enhancing the expressiveness of structured reporting systems. J Digit Imaging 2000 May; 13 (2 Supplement 1):49-53.] However, these systems restrict users input to a predefined number of "codeable" entries, which in complex domains such as medicine, fall far short of the expressiveness of natural language required by their target audience.

One major hurdle to providing context specific questions, which could improve document content, is having a detailed semantic understanding of the language used by document authors. Semantic extraction starts with defining the relevant concepts in a circumscribed area of knowledge—a domain. Few tools and methods are available for systematically categorizing domain knowledge, especially for medium to large scale domain. Knowledge engineers often spend months creating even modest knowledge bases. Without a semantic knowledge-base, it is impossible to trigger context specific questions.

Another hurdle that must be overcome to make the questions helpful to authors, is a control system that prioritizes the most important questions that should be considered, and suppresses questions that have already been answered by the information in the document.

Finally, the cost of building an automated advisory system is currently prohibitive because there are no tools to create the questions or control under which context they will appear.

OBJECTS AND ADVANTAGES

The present invention has been developed in response to the present state of the art, and in particular, in response to unmet needs for improving the quality of documents in a specific knowledge domain such as radiology. It is therefore a primary object of the present invention to provide a novel system and method for generating specific questions to improve document content using techniques in semantic recognition and expert systems.

Still another object of the present invention is a method to prioritize which questions are displayed in a given document context.

Yet another object of this invention is a question generation system which can be used either with document editing systems (word processors) or speech recognition systems interactively or after document construction.

An additional object of this invention is a method for using properties intrinsic to the semantic knowledge hierarchy to inhibit the display of redundant questions.

A related object of this invention is an advanced question editor which can be used by a knowledge engineer with little computer engineering expertise to display relevant questions triggered by semantic entities in the domain.

SUMMARY OF THE INVENTION

The present invention describes a method and system which improves document quality, by asking specific questions which can alert an author of possible omissions in document content, or suggest refining concepts that are documented in either vague or general terms. The system analyzes free text input produced with either a text editor or during speech recognition, and retrieves semantic propositions, which represent the knowledge contained in each sentence. Additional semantic propositions are retrieved that are closely related to these semantic propositions. Semantic propositions are linked to questions created by a domain expert and assigned a specific priority through a 'Question Editor' depending on how important they are relative to the triggering semantic information. An expert system displays the question list on user demand and is filtered based on several parameters specified in the Question Editor and the current state of the document's content.

DRAWINGS

These and other features of the Subject Invention will be better understood in relation to the Detailed Description taken in conjunction with the drawings, of which:

Figure 1:
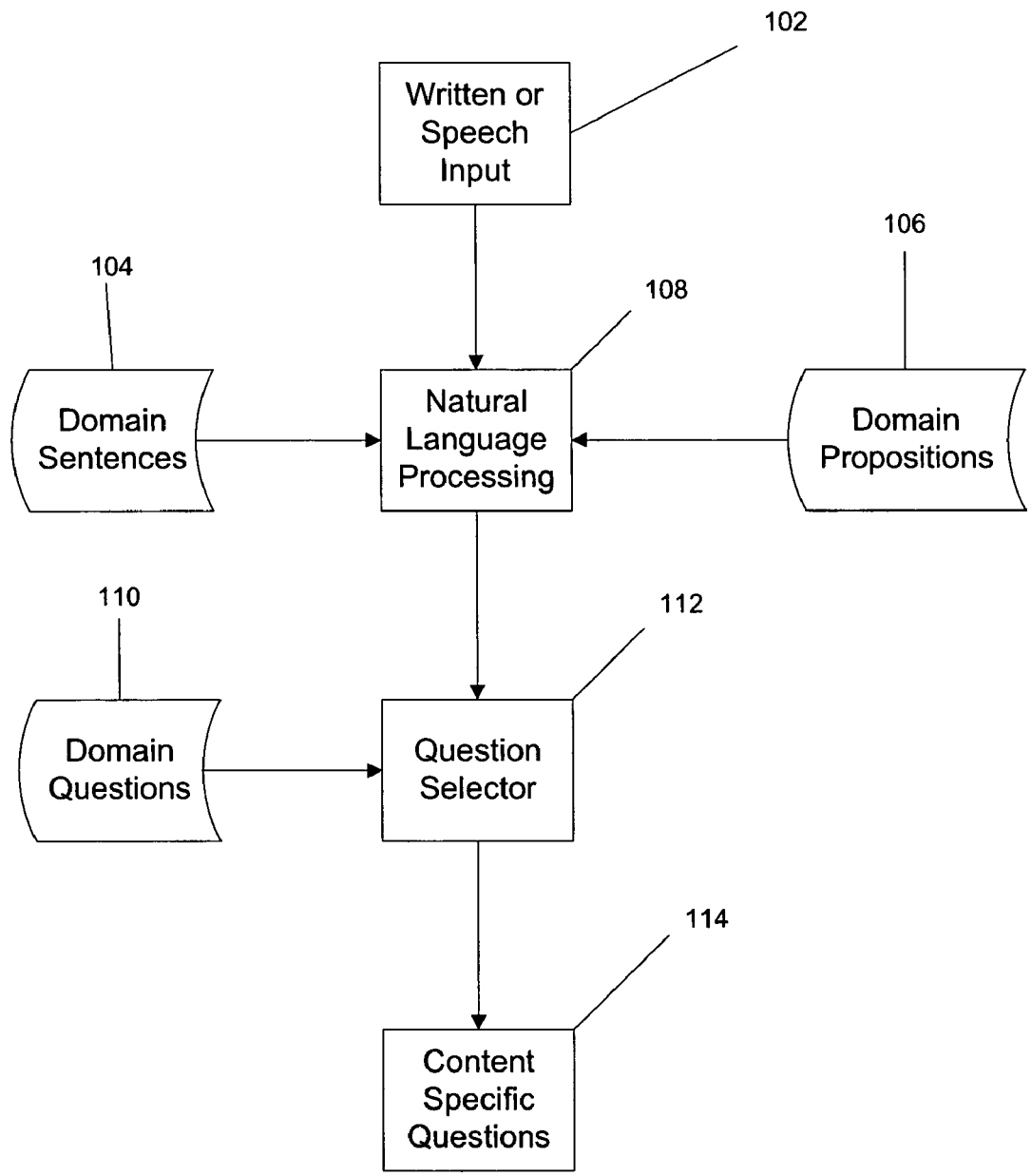
FIG. 1 is a block diagram showing the construction of one embodiment of the invention using a speech recognition component, a semantic processing module, and a question generating module.

Understanding that these drawings depict only typical embodiments of the invention and are not to be construed to limit its scope, the invention will be described in detail below.

DETAILED DESCRIPTION OF THE PREFERRED EMBODIMENTS

The present invention employs several knowledge base components described in application Ser. No. 10/844,912 titled, "Process for constructing a semantic knowledge base using a document corpus, herein referred to as "corpus based knowledge construction". Briefly, that invention describes the steps for mapping the set S of sentences in a corpus of related documents, to the set M, of unique meanings or propositions in a knowledge domain to form a semantic knowledge base. A knowledge domain is the semantic knowledge contained in a large corpus of related documents from a domain, for example the semantic knowledge in 500,000 radiology reports. The fundamental unit asserted in the semantic knowledge base is a proposition expressed as a declarative sentence, conveying the underlying meaning of a document sentence. Propositions are distinct from the sentences that convey them, although they are related. For example, the sentences "The chest x-ray is normal" and "The chest x-ray is within normal limits" map to the same proposition or meaning. The knowledge-base designer creates propositions in a semi-automated fashion by drawing from common sentences in the corpus using software tools. By mapping sentence variants to the same proposition, the equivalence of different free-text sentences is accurate because strong methods of string matching are used, over weaker statistical methods. Propositions and sentence mapping are systematically performed to fully characterize the semantic knowledge of a domain. The current invention uses the semantic knowledge base, and a table that associates free-text sentences with their underlying propositions from this earlier work. The following definitions may be useful.

DEFINITION LIST 1

Term: Proposition
    Definition: Atomic unit of semantic meaning capturing in whole or part the knowledge within a declarative sentence.

Term: Related propositions
    Definition: Propositions that co-occur within a particular sentence or document.

Term: Knowledge domain
    Definition: The set of all propositions that make represent the knowledge within a specialized field of study such as radiology.

Term: Corpus
    Definition: A large collection of related documents or reports from which a semantic knowledge base can be derived.

Term: Validated sentence
    Definition: An input sentence that is found in a database of sentences derived from analyzing a corpus.

Term: Unknown semantic meaning
    Definition: A sentence that has not been mapped to one or more propositions.

Term: Natural language processor
   Definition: The subsystem of the present invention responsible for validating sentences, and matching input strings to semantic proposition(s).

Term: Question selector
   Definition: The component of the present invention responsible for determining which questions are returned to an application program based on the current state of information in the document.

Term: Trigger proposition
   Definition: A proposition that if found in a document can cause the display of one or more questions.

Term: Suppressing proposition
   Definition: A proposition that if found in a document can inhibit the display of a question.

Term: Globally Unique Identifier (GUID)
   Definition: A long hexadecimal number that is guaranteed to uniquely identify a row in a table.

Term: Question table
   Definition: A relational database table where each row is uniquely identified with a GUID for storing questions that are linked to propositions.

Term: Question priority
   Definition: A number assigned by a knowledge engineer indicating the importance of answering a specific question when authoring a document or report.

Term: Question editor
   Definition: A tool for creating questions and linking them to propositions and indicating their priority. Also a tool for assigning to questions, one or more suppressing propositions.

FIG. 1 depicts a block diagram of the major system components. According to the preferred embodiment all the components of the system run on a local computer with one or more processors. A speaker talks into microphone that provides input to commercial speech recognition software or employs a word processor to create written language input (102). If speech recognition is used, a combination of hardware and specialized software transforms the acoustic signal to a digitized form. A variety of algorithms employing both phonetic and language models well-known to those skilled in the art of speech recognition create one or more sentence hypotheses, the top one being used as input to the natural language processing subsystem. The natural language processing subsystem (108) uses a database of domain sentences (104) and semantic propositions (106) to match the input sentence to a known sentences and semantic proposition(s) respectively. The domain sentences are derived from analyzing hundreds of thousands of documents for a specific knowledge domain. As described in corpus based knowledge construction, a unique sentence table (domain database 104) can be constructed from a corpus of related documents sorted by frequency count. Additionally, a knowledge base designer can methodically analyze and construct a knowledge base of propositions (domain propositions 106), which represent the semantic meaning of these sentences. The output of semantic proposition(s) is input to the question selector component (112). The question selector is an expert system that augments the document propositions with related propositions derived by analyzing the co-occurrence of propositions in a large corpus of documents. The method to accomplish this is documented in corpus based knowledge construction. Each proposition is matched to corresponding question(s) stored in a question table (110). Based on specific parameters created by a knowledge engineer, the question selector passes the questions to the application after applying sort criteria (114).

Figure 2:
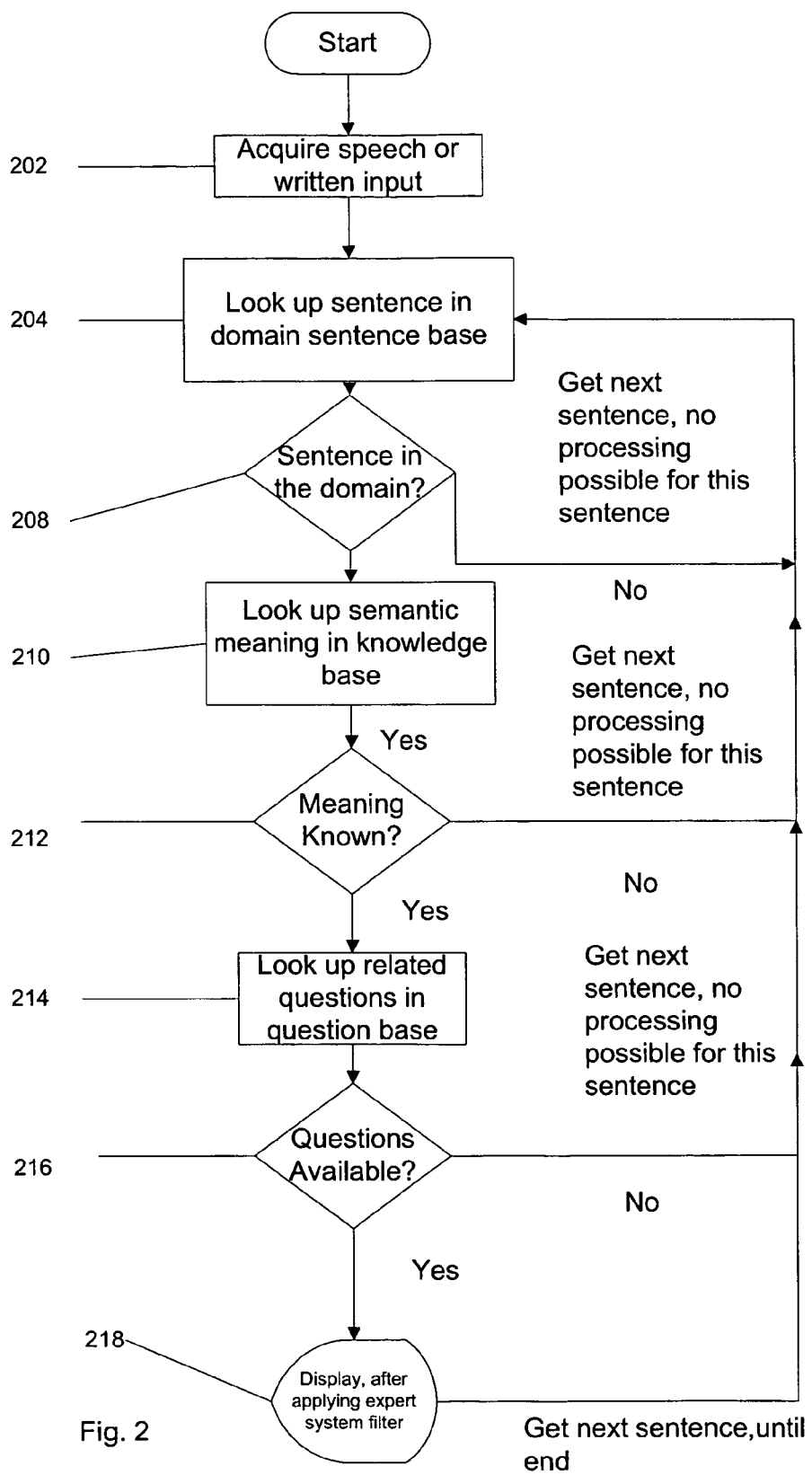
FIG. 2 is a flowchart of the operation of the components shown in FIG. 1.

FIG. 2 shows, in flow chart form, the steps which are carried out in the embodiment described in connection with FIG. 1. FIG. 2 shows that either recognized speech, i.e. reduced to written words by commercial speech recognition software, or electronic text produced by variety of word processing programs (202) is fed into the natural language processor subsystem where a comparison is made with a database of known sentences (204). Typically the sentence database would contain millions, to ten of millions of sentences for a specialized knowledge domain. If an exact or close match is found excluding delimiters such as dashes, periods, or parenthesis the sentence is considered validated (208) and is passed to the semantic look up module of the natural language processor. If a validated sentence is not found, the next sentence in the document is obtained since no questions can be generated for this sentence After a validated sentence is found, a query to the semantic knowledge base constructed through the methods described in corpus based knowledge construction is performed (210). If one or more domain propositions (212) are found, they are passed to the question selector responsible for assembling the relevant questions. If no domain propositions are found the sentence is marked as unknown semantic meaning (212). This sentence can not be further processed, and the next sentence in the document is obtained.

Each question is assigned a unique identity using the question editor. After each semantic proposition is returned by the natural language processor, a query to the question table returns all the questions linked to this proposition (214). After all the linked questions are found (216) they are sorted by the question selector using the priority score explained below (218). If no questions are found the next sentence in the document is processed until none are left. As additional sentences are processed, a list of all the unique questions is maintained through the question selector, by checking a hash table to see if the question key is already present in the question collection. Other methods for storing a unique list could be employed by those knowledgeable in creating collections of software objects. If no questions can be found the null list of questions are returned. Questions are assigned a priority score by the knowledge base designer. Higher priority questions can be displayed in distinctive colors or with unique labels. The question is considered "ANSWERED" if the semantic knowledge in the document is directly linked to the question. Otherwise a proposition may suppress the display of a question if indirect links between the semantic knowledge and the question exists (see section on question editor).

Figure 3:
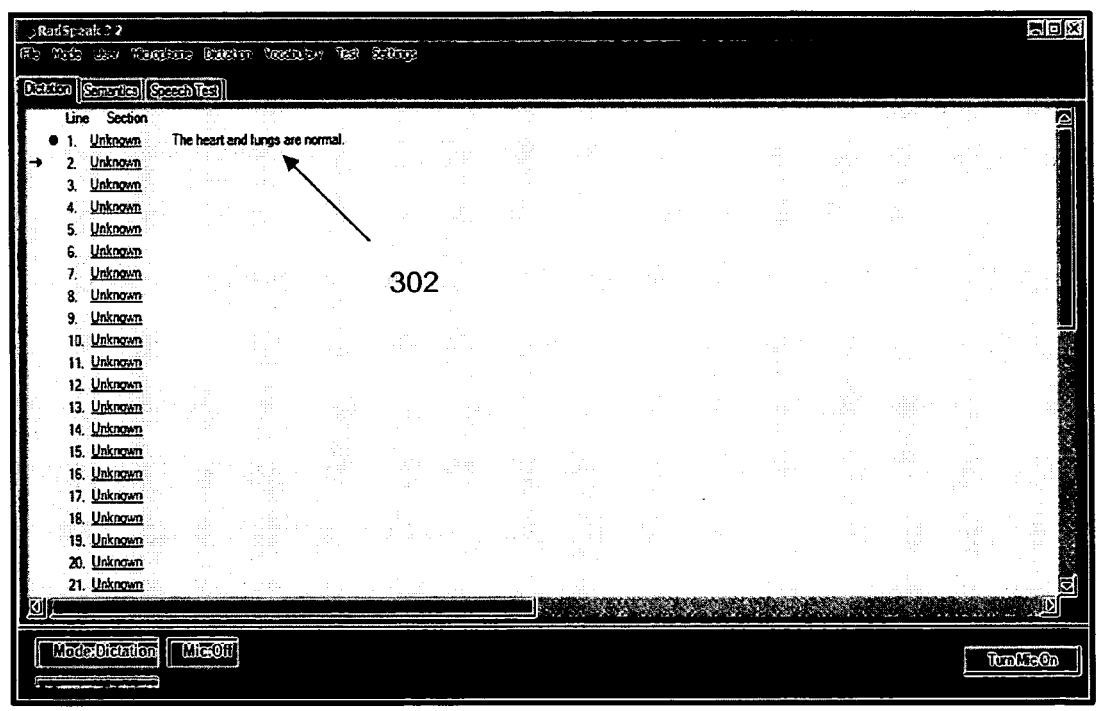
FIG. 3 is a bitmap rendering of a computer screen displaying one embodiment of a computer interface using speech input for the present invention.

FIG. 3 shows one embodiment of the graphic user interface (GUI) display of a speech recognition application used as input to the current invention. In this example, the user spoke the utterance "The heart and lungs are normal" (302). The top rated hypothesis from the speech engine was found in the sentence database so the sentence was validated and displayed with a green dot next to the sentence in the dictation window (302).

Figure 4:
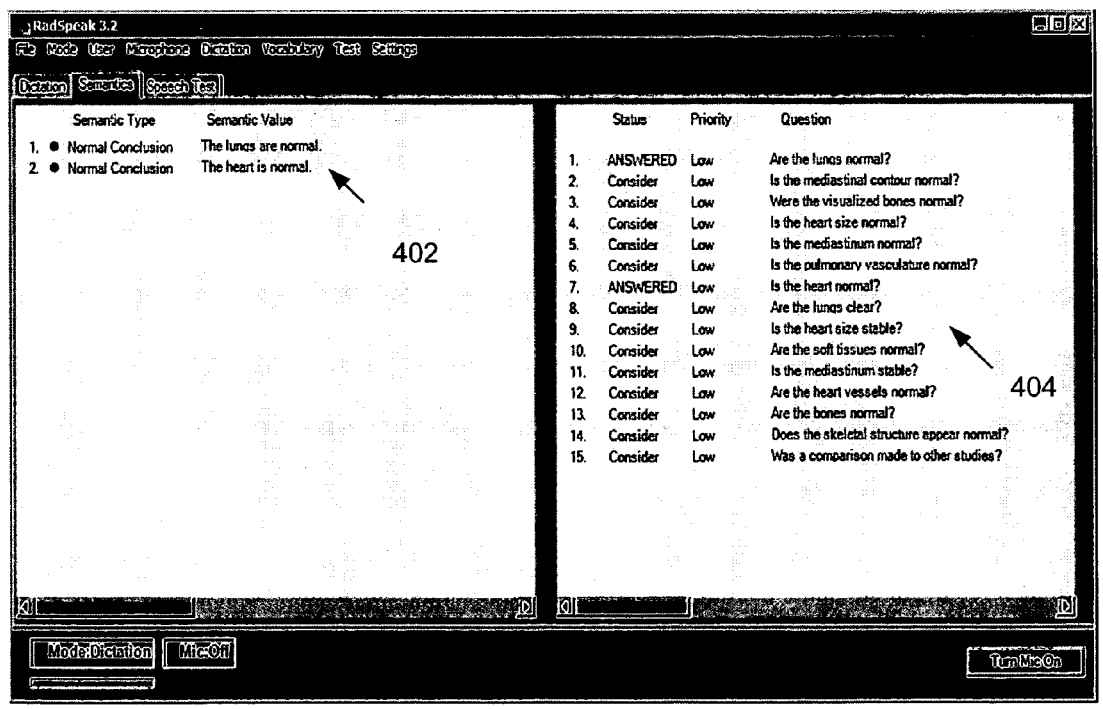
FIG. 4 is a bitmap rendering of a computer screen displaying one embodiment of a computer interface showing the result of the application of the invention in response to the input, "The heart and lungs are normal."

FIG. 4 shows one embodiment of GUI display for the semantic and question display application of the current invention. In this case, the semantic knowledge base contained two propositions, which encoded the meaning of the example sentence, "The heart is normal", and "The lungs are normal". Both semantic propositions are typed as "normal conclusions" (402).

In the right hand pane of FIG. 4 the question selector assembled a list of questions relevant for a radiology report containing this line of text. Note that since two of the questions, "Are the lungs normal?" and "Is the heart normal?" are directly answered by the semantic propositions in the left hand pane, both questions are marked as "ANSWERED". Additional questions are assembled using the co-occurrence of relatedpropositions to the propositions in the left hand pane. Since there is no other information in this report all these questions are displayed with the status of "Consider". Because this single line of text contains two semantic propositions which are only routine conclusions, all the questions are marked with the priority of "Low". Nevertheless, these questions could stimulate residents trying to improve his/her report by refining their observations. For example, the question "the pulmonary vasculature is normal?" would be an important observation to make in many chest x-ray reports.

Figure 5:
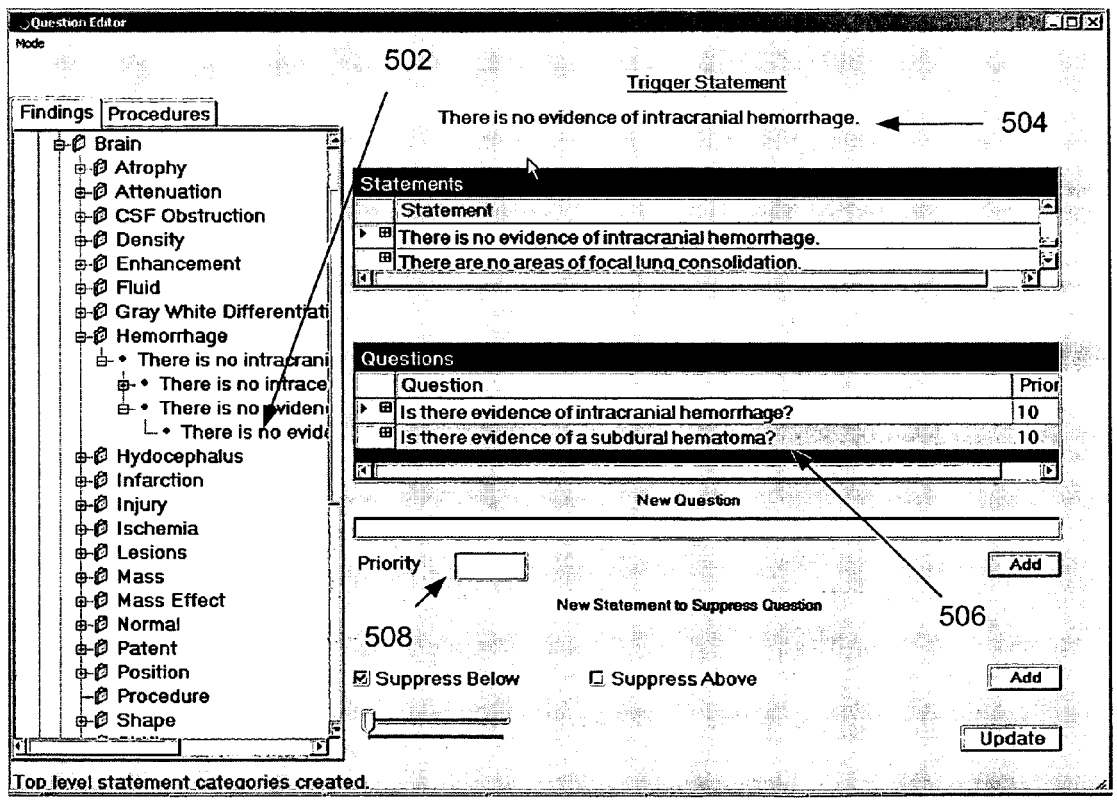
FIG. 5 is a bitmap rendering of a computer screen showing one embodiment of the Question Editor for creating questions linked to particular elements of semantic knowledge called propositions.

FIG. 5 shows one embodiment of a GUI display for the Question Editor. A tree of semantic propositions (502) classified by categories assigned by a knowledge engineer is assembled using the techniques in corpus based knowledge construction. By clicking on a specific proposition the knowledge engineer can make it serve as a trigger proposition (504) for the question selector when a matching proposition is added to a document. Specific questions are created by the knowledge engineer (506) and linked to this proposition. Each question is assigned a globally unique identifier (GUID). While the questions are easy to add with the simple click of a button, domain expertise is necessary to make them relevant to the semantic proposition. The knowledge engineer designates the priority of the question (508) as a number from 0 to 1000. The question selector uses this number to prioritize where this question should be displayed in the list of questions returned. The application can flag the importance of the question by reading the priority field and displaying an indicator such as low, medium, or high.

Figure 6:
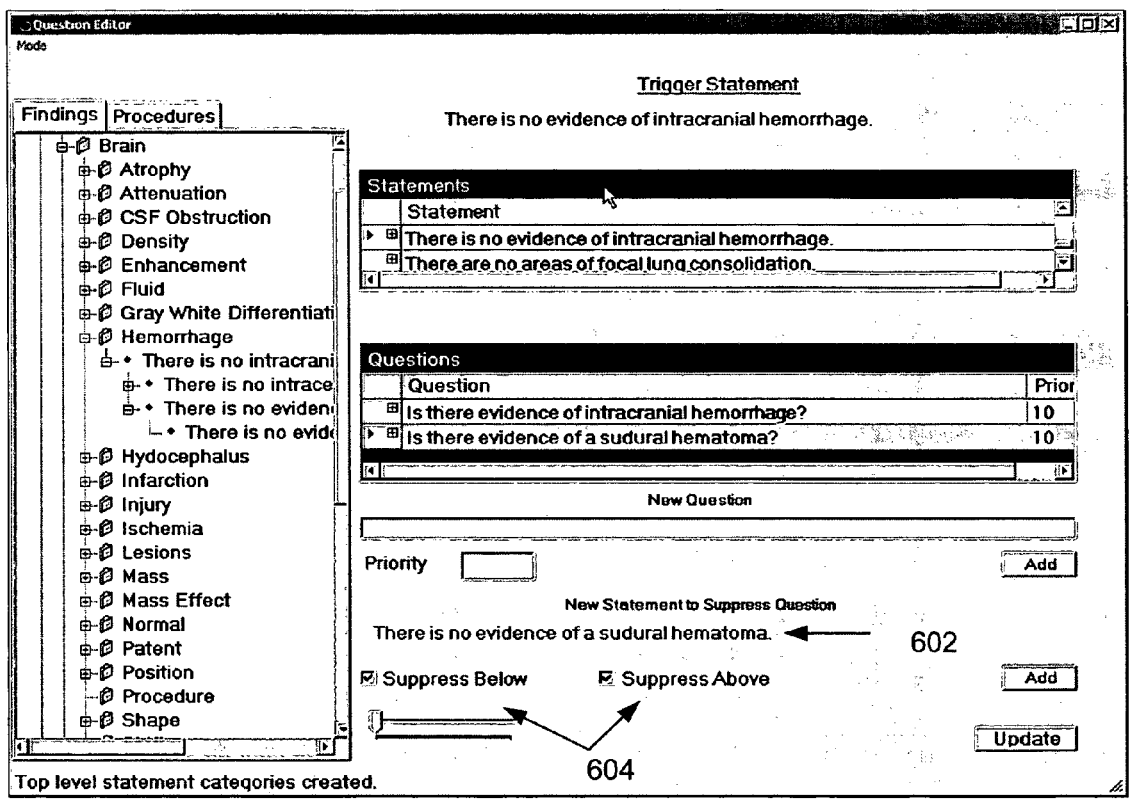
FIG. 6 is a bitmap rendering of a computer screen showing one embodiment of the Question Editor for adding semantic propositions to suppress the display of a specific question.

FIG. 6 shows another characteristic of the Question Editor. In this example the trigger proposition is "There is no evidence of intracranial hemorrhage." There are two linked questions, a general one, "Is there evidence of intracranial hemorrhage?", and a more specific question, "Is there evidence of a subdural hematoma?" The knowledge engineer can add one or more propositions (602) to suppress the display of this question should this knowledge be present in the document. The suppressing propositions are stored in a relational database table linked to the question through a unique key. The design and implementation of these tables is well known to those skilled in the art of relational database development. The question selector examines this table for cross-references to all propositions identified in the document in order to suppress returning redundant questions.

Additionally, the knowledge engineer can use the position of the proposition in the knowledge hierarchy to suppress other questions. The semantic knowledge base is arranged so that more general propositions subsume more specific ones as described in corpus based knowledge construction. For example, the proposition, "There is no intracranial hemorrhage" subsumes the proposition, "There is no evidence of intracranial hemorrhage", and this subsumes the proposition, "There is no evidence of a subdural hematoma." The knowledge engineer can indicate through checkboxes (604) in the Question Editor to suppress all questions linked to semantic propositions either above or below the indicated proposition in the same category of the hierarchy. The question selector examines these fields prior to adding a question to the list, which is returned to the application displaying the questions.

As is known in the art, the methods and apparatus discussed herein is practiced through computer readable program code in conjunction with a computer system to carry out all or some of the steps to perform the methods described. As well known in the art, such computer system consist of a general purpose data processor, computer memory, and any of a number of storage devices such as floppy disks, hard drives, compact disks, or memory cards, as well as computer displays such as LCD display screens, or CRT displays. They computer system may be part of a computer network, or operated in a stand alone mode. The operation of such a general purpose computer system is well known to those in the art of data processing, and the specifics of the hardware implementation can vary enormously while achieving the exact same results using the methods of the present invention.

DESCRIPTION AND OPERATION OF ALTERNATIVE EMBODIMENT

The system could be devised as a computer service where input sentences are sent over a computer network to a remote computer processor that generates the question list and returns it over a computer network to the local application. The questions could be linked to reference information that could help the writer understand how to frame a potential response to the question.

ADVANTAGES

From the description above, a number of advantages of my process for improving document content become evident:

Specific questions relevant to the current document context can be provided to an author, which can prevent significant omissions, or refine vague or general expressions into one or more specific observations or conclusions.

Related questions can be automatically generated through the use of a co-occurrence table that defines high frequency associations of related propositions by analyzing a large number of prior documents.

The questions are displayed in near real-time after processing the natural language of the user instead of the limited structured input used in some reporting systems.

Redundant questions can be suppressed based on the semantic knowledge in the document and information provided by a knowledge engineer through the Question Editor. This question selector then returns a list of highly context specific questions to the reporting application.

The system is able to flag questions of high importance based on a priority score supplied by a knowledge engineer using the Question Editor.

The Question Editor makes it very easy to create and suppress questions without computer programming, and to link questions to trigger propositions selected by a knowledge engineer.

The system works in near real-time since expensive parsing operations are not needed.

The system can provide interactive feedback during the creation of a document, or non-interactively after the entire document is created.

Although the description above contains many specifics, these should not be construed as limiting the scope of the invention but as merely providing illustrations of some of the presently preferred embodiments. Thus the scope of the invention should be determined by the appended claims and their legal equivalents, rather than by the examples given.

What is claimed is:

1. A method for creating context specific document questions, comprising:
   (a) obtaining an input sentence, and
   (b) a computer processor retrieving said sentence from a database of known sentences in a knowledge domain created by segmenting at least a portion of a document corpus into individual sentences and,
   (c) said processor retrieving corresponding sentential semantic proposition(s) which represent the entire meaning of said sentence from a semantic mapping table created by domain experts through a process of semantically annotating entire sentences from said corpus to sentential propositions, and
   (d) said processor retrieving corresponding question(s) to said sentential semantic proposition(s).

2. The method according to claim 1 wherein a collection of unique questions are returned to a user for all the sentences in the document.

3. The method according to claim 1 wherein the input sentence is produced as the result of speech recognition or word processing.

4. The method according claim 1 wherein questions that have been given a higher priority by domain experts are displayed with a different visual indication from questions of lower priority such as a different color, font, size, highlighting, label, or any combination.

5. The method according to claim 1 wherein the return of a question is suppressed based on sentential proposition(s) in the document and question suppression proposition(s) linked to said question.

6. The method according to claim 1 wherein a link to reference information is made to one or more question(s) which supplies a user with either background information on the question, or specific suggestions to incorporate into said user document.

7. The method according to claim 1 where a user sends input sentences over a computer network to a remote question selector and questions are returned over a computer network to said user.

8. The method according to claim 1 where a question is returned or displayed with the attribute, "ANSWERED", or a similar attribute if one or more sentential proposition(s) in the document directly answer the said question.

9. The method according to claim 1 where questions are returned to a user in near real-time as sentences are added to a document.

10. The method according to claim 1 where questions are returned to a user after the entire document is created.

11. A method for creating context specific document questions, comprising:
    (a) obtaining an input sentence, and
    (b) a computer processor retrieving said sentence from a database of known sentences in a knowledge domain created by segmenting at least a portion of a document corpus into individual sentences and,
    (c) said processor retrieving corresponding sentential semantic proposition(s) which represent the entire meaning of said sentence created by domain experts through a process of semantically annotating entire sentences from said corpus to sentential propositions, and
    (d) said processor retrieving related sentential semantic proposition(s) to said sentential semantic proposition(s) in a co-occurrence table generated by analyzing said corpus, and
    (e) said processor retrieving corresponding question(s) to said related sentential semantic proposition(s).

12. The method according to claim 11 wherein a collection of unique questions are returned to a user for all the sentences in the document.

13. The method according to claim 11 wherein the input sentence is produced as the result of speech recognition or word processing.

14. The method according claim 11 wherein questions that have been given a higher priority by domain experts are displayed with a different visual indication from questions of lower priority such as a different color, font, size, highlighting, label, or any combination.

15. The method according to claim 11 wherein the return of a question is suppressed based on sentential proposition(s) in the document and question suppression proposition(s) linked to said question.

16. The method according to claim 11 wherein a link to reference information is made to one or more question(s) which supplies the user with either background information on the question, or specific suggestions to incorporate into said user document.

* * * * *